Feb. 28, 1956 W. A. WILL 2,736,854
MOTOR OPERATED DEVICE AND REMOTE CONTROL THEREFOR
Filed Nov. 25, 1949 3 Sheets-Sheet 3
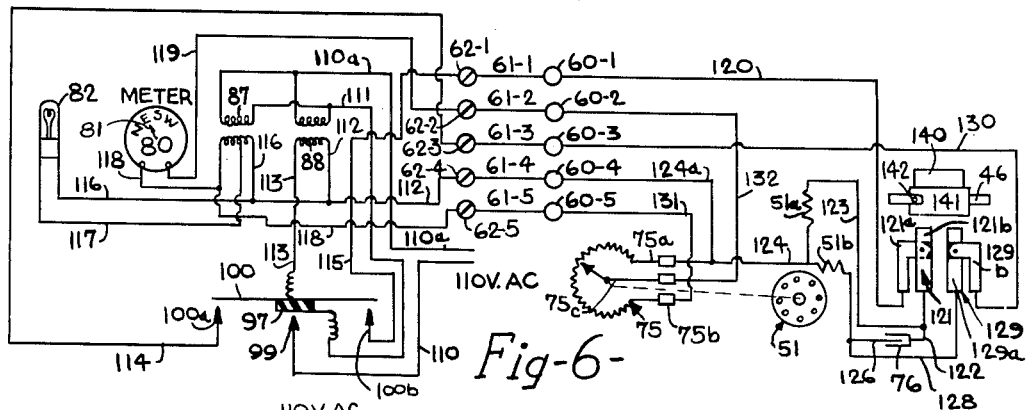
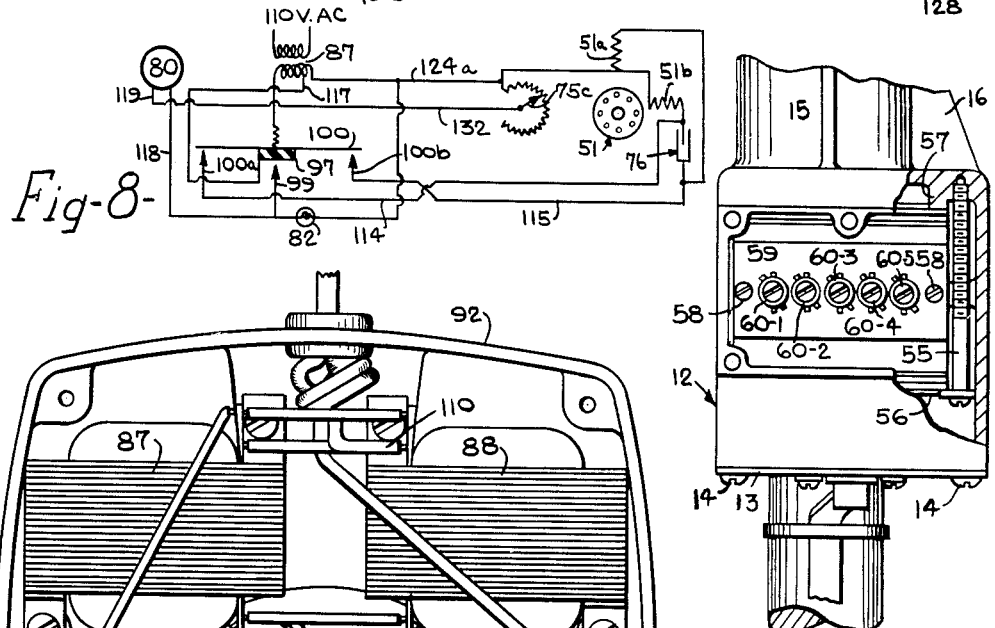
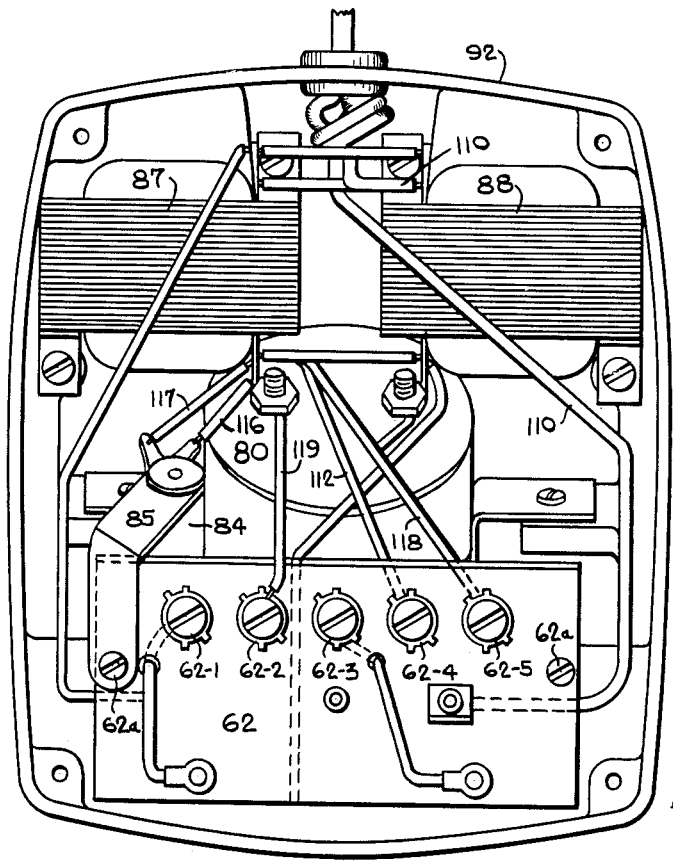
INVENTOR.
WILBERT A. WILL
BY
Klicke & Padlon
ATTORNEYS

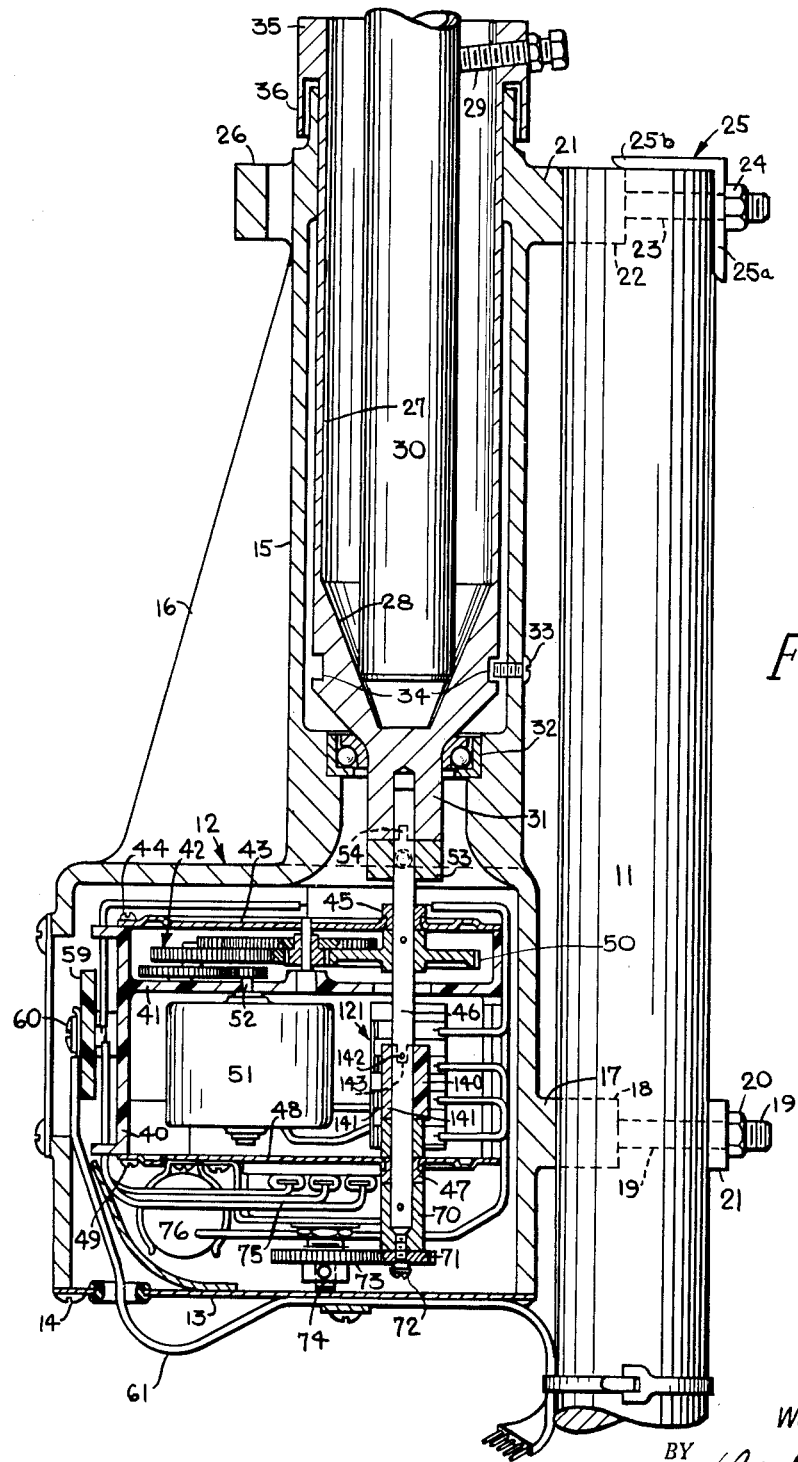
Fig-1-
INVENTOR.
WILBERT A. WILL
BY
*Kliche & Padlon*
ATTORNEYS

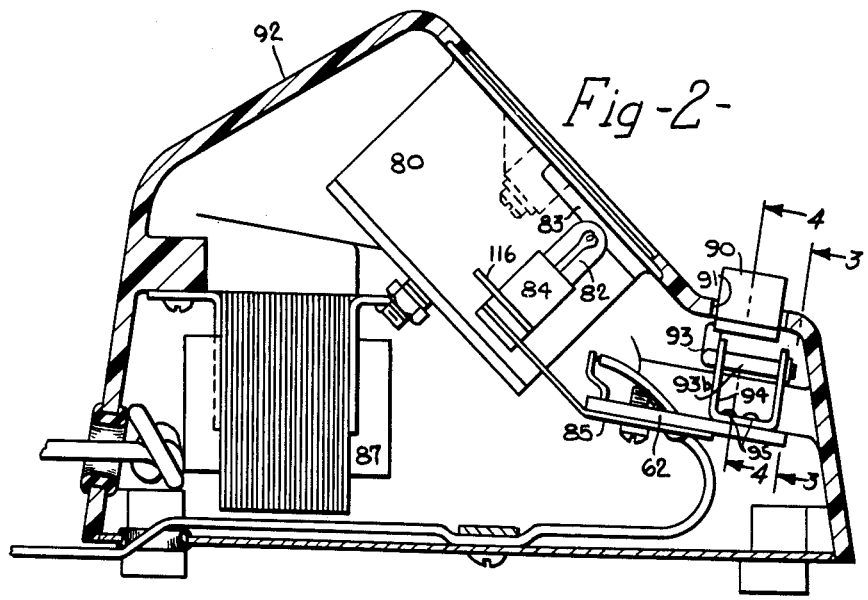
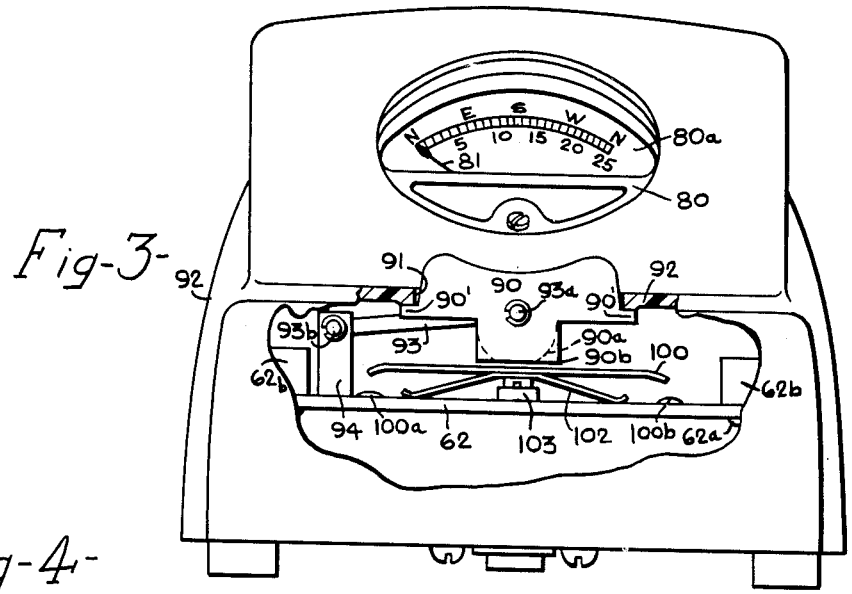
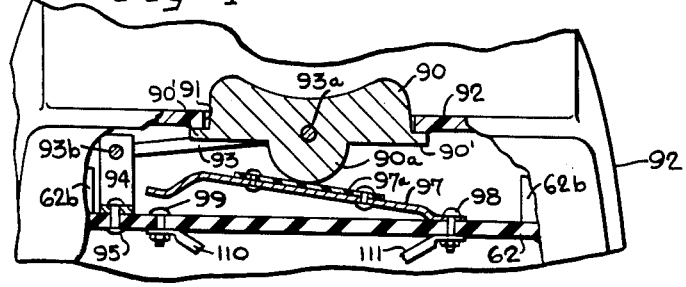
INVENTOR.
WILBERT A. WILL

United States Patent Office 2,736,854
Patented Feb. 28, 1956

2,736,854

MOTOR OPERATED DEVICE AND REMOTE CONTROL THEREFOR

Wilbert A. Will, New Bremen, Ohio, assignor to Crown Controls Company, Inc., New Bremen, Ohio, a corporation of Ohio Application November 25, 1949, Serial No. 129,265

6 Claims. (Cl. 318—289)

This invention relates to improvements in motor operated device and remote control therefor and has for an object to provide an improved device of this type which is particularly adapted for use as an antenna rotator particularly for television and other short wave radiant energy reception devices.

Another object is to provide such a turret member comprising an outer casing or housing which supports and encloses a rotatable turret member adapted to receive and support the device to be rotated, and an inner casing or housing removably housed in said outer casing and serving to house a reversible electric motor, reduction gearing driven thereby driving a low speed power shaft adapted for connection with for driving the turret member and also housing and supporting electrical devices.

Another object is to provide an improved control instrument adapted for remote location for energizing and controlling the operation of the motor in the turret member.

Another object is to provide such a device including indicating means in the control instrument controlled by a control device in the turret member for indicating at the control instrument the rotative position of the turret.

Another object is to provide such a control instrument including two step-down transformers, one of which delivers power for rotating the electric motor, and the other delivers power for energizing the position indicating mechanism whereby the voltage applied to the indicating mechanism is not affected by the power drawn when the motor is operating.

Another object is to provide an improved switch as part of the control instrument which switch is capable of performing three functions:

1. Energizing the primaries of the transformers;
2. Energizing the primaries of the transformers and establishing a circuit from the power transformer to rotate the motor in the turret in one direction; and
3. Energizing the primaries of the transformers and establishing a circuit from the power transformer to rotate the motor in the turret in the other direction.

Another object is to provide such a switch constituting an elongated bar, the parts being so arranged that when force is applied near the center of the bar, the first function mentioned above will be obtained, and when force is applied near one end of the bar, the second function mentioned above is obtained, and when a force is applied to the other end of the bar, the third function mentioned above is obtained.

Another object is to provide a switch capable of closing a circuit when manipulated in a certain manner and of closing said circuit and another circuit when manipulated in another manner.

Another object is to provide such a device including a lamp for illuminating the indicator, the circuits being such that the lamp may be energized without causing rotation of the motor.

Another object is to provide such an arrangement in which the lamp is energized at all times when the switch is operated to perform any one of the three functions mentioned above.

Another object is to provide limit switches to deenergize the electric motor when it has been operated to rotate the turret to either end of its desired rotation, usually over 360°, the limit switches being so arranged that when one of the switches is opened, the other remains closed to provide a circuit for rotation in the reverse direction.

Other objects will appear from the following description of an illustrative embodiment of the invention taken together with the attached drawings wherein:

Fig. 1 is a vertical cross-sectional view of such a rotatable turret mechanism, the support mast and the antenna mast being shown in full lines with certain parts, however, shown broken away;

Fig. 2 is a vertical longitudinal cross-sectional view of the control instrument, certain parts being shown in full lines;

Fig. 3 is a front view of said control instrument, certain parts being broken away along the line 3—3 of Fig. 2 to show the switch mechanism;

Fig. 4 is a partial cross-sectional view on the line 4—4 of Fig. 2;

Fig. 5 is a bottom view of the control instrument;

Fig. 6 is a schematic view showing the electrical circuits;

Fig. 7 is a front view of the turret, the cover over the terminal board being omitted and certain parts broken away; and Fig. 8 shows the electrical circuit of a modified form of the invention.

Referring to said drawings, 11 indicates the usual support mast which is supported in the ground or on the roof or chimney of a building in any common or usual manner. 12 indicates generally the outer casing or housing consisting preferably of a rectangular box, the lower open end of which is normally closed by a cover 13 held in place by screws 14, and having an upwardly extending hollow standard 15 preferably reinforced by an integral rib 16. The rear side of the housing is preferably formed with a lug 17, having a V-shaped depression 18 therein to bear against the support mast 11. Said lug is provided with two studs 19 having nuts 20 thereon to press a cross bar 21 against the support mast 11. At the upper end of the turret standard, there is a similar lug 21 having a V-shaped recess 22 therein, and supporting a pair of studs 23 having nuts 24 thereon, said studs passing through a cross bar 25 of angle iron. The vertical portion 25a thereof serves to clamp the upper part of support mast 11 into the V 22 and the horizontal part 25b thereof serving to bear against the upper end of mast 11 to take the weight of the turret device particularly during installation. 26 indicates an eye preferably formed integral with the turret standard for conveniently attaching guy wires or cables where needed.

The standard 15 is formed with a generally cylindrical bore within which is received for rotation therein the rotatable cup 27 within which is received the antenna mast or other supported mast 30. The turret cup is preferably formed with a conical bottom 28 against which bears the lower end of the mast 30 for centralizing said mast. Clamp screws 29, at least three in number, serve to clamp the mast 30 and, due to their inclined position, serve to force the mast 30 downwardly for firm centralized engagement with the conical bottom 28. In cases where the mast 30 is tubular, it is contemplated that instead of using a conical seat, a conical point may be provided to enter into the bottom of such tubular mast. The lower part of the antenna cup is shown formed with a reduced shank 31 passing through the inner race of an angular contact ball bearing generally designated 32, the outer race of which is tightly seated in an internal bore against a faced shoulder within the standard 15. Set screw 33 bears in a groove 34 around the turret cup to prevent withdrawal of the cup from the standard. The upper part of the cup is preferably formed of thicker material as shown at 35 and formed with a skirt 36 to prevent the entry of water into the joint between the cup 27 and the bore in the upper part of the standard within which the cup rotates.

Mounted within the outer housing 12 is the inner housing 40 of generally rectangular shape and formed with a partition wall 41 which carries studs upon which the reduction gears designated generally 42 may be journalled. The gear section is closed by the top plate 43 held thereon by screws 44 and carrying a bearing sleeve 45 for shaft 46, the other end of which is journalled in a bearing sleeve 47 carried by bottom plate 48 attached to housing 40 by means of screws 49. Shaft 46 carries a gear 50 which is driven through the reduction gearing designated generally 42. As the gearing preferably provides a very substantial gear reduction, the speed of rotation of shaft 42 will be very much less than the electric motor 51 which drives the gearing 42 through its output shaft 52. The shaft 46 carries a driving hub 53 preferably splined thereto and provided preferably with a spline 54 received in a corresponding notch in the lower part of the shank 31 whereby the shank 31 and the turret cup 27 are rotated by rotation of the shaft 46.

The inner casing 40 is held in place within the outer casing 12 by means of screws 55 (Fig. 7) passing through cross bars 56 and serving to clamp the casing 40 against lugs 57 within the outer casing 12.

Attached to the front of casing 40, preferably by means of screws 58, is a terminal plate 59 carrying the terminal screws 60-1, 60-2, 60-3, 60-4, and 60-5 for receiving respectively conductors 61-1, 61-2, 61-3, 61-4, and 61-5 (Fig. 6) contained in the cable 61 which leads to the control instrument where said wires are connected respectively with terminals 62-1, 62-2, 62-3, 62-4, and 62-5, mounted on the terminal board 62 forming part of the control instrument (Fig. 5).

The lower end of the shaft 46 carries for rotation therewith a bushing 70 against the end of which is held a gear 71 preferably by means of a screw 72. Said gear meshes with a preferably larger gear 73 mounted on the operating shaft 74 of a potentiometer 75 whereby the potentiometer will be positioned in accordance with the rotative position of shaft 46. 76 indicates a capacitor which is necessary if a capacitor run electric motor is used. 80 (Figs. 2, 3, 5, and 6) indicates a suitable electric meter such as an alternating current milliammeter which serves as the indicating instrument, the position of its pointer 81 being determined by the setting of the potentiometer 75 which, in turn, is effected by the rotative position of shaft 46 and turret cup 27. The meter dial 80a is suitably graduated with the cardinal points of the compass as N, E, S, W, N representing north, east, south, west, and north, respectively. 82 is a lamp which serves to illuminate the meter dial at certain times via opening 83 (Fig. 2). Said lamp is mounted in socket 84 supported by strap 85. The control instrument housing 92 also contains the transformer 87 which serves to supply power at times at any desired low voltage, such as 5 volts, for the lamp 82, and also supplies power at times at any desired higher voltage, such as 25 volts, to the indicating circuit. The housing also contains a transformer 88 which supplies power at times at, say 25 volts, to the driving motor 51.

Referring to Figs. 2, 3 and 4, 90 represents a desirable form of switch operating bar projecting through an opening 91 in the housing 92 of the control instrument. It is preferably formed with extensions 90' underlying the wall of said casing. It is supported in part by means of a lever 93 having a bent over portion 93a extending through a hole in the switch bar and having another bent over portion 93b at its other end journalled in openings in a bracket 94 preferably of U-formation and attached by means of rivets 95 to the insulating plate 62 which also carries the terminals 62-1, 62-2, 62-3, 62-4, and 62-5. Said plate is shown held in place by screws 62a against suitable lugs 62b formed as part of the instrument casing 92. The rear portion of the under side of switch bar 90 is formed with a preferably rounded projection 90a (Fig. 4) which bears on switch arm 97 attached at 98 to the plate 62, its free end serving when depressed to engage contact 99 for a purpose to be described later. If the switch bar 90 is made of conductive material, it is desirable to have the part 90a bear against an insulating strip 97a carried by the switch blade 97.

The forward portion of the under side of the switch bar 90 is formed with a rectangular extension 90b (Fig. 3), on the lower side of which are mounted, preferably in insulating relation thereto, the switch blade 100 and the return spring 102 as by means of a screw 103. The spring 102 serves to press the switch bar upwardly into the position shown in Figs. 2, 3, and 4 with the extensions 90' pressing up under the casing 92. The switch blade 100 serves to engage at times either the contact 100a or the contact 100b.

It will be seen that if force is applied to the center of the switch bar 90, it will be depressed without a substantial change in its angular position with the result that switch blade 97 will engage contact 99 and thereby close the primary circuit to the two transformers 87 and 88.

The secondary of transformer 88 remains open but the secondary from transformer 87 energizes lamp 82 and also the indicating circuit through meter 80 and potentiometer 75 whereby the dial is illuminated and the pointer 81 moves to a position indicating the rotative position of the turret.

If force is applied to the left end of switch bar 90, the contact blade 97 will be pressed into engagement with contact 99 with the result stated above, and the switch blade 100 will be caused to engage contact 100a with the result that the motor will rotate in such a direction that the antenna will be rotated to move toward north via east; viz., in a counter-clockwise direction as viewed from above. While this is occurring, the pointer 81 is moving constantly to indicate the position of the turret.

If now force is applied to the right end of switch bar 90, the contacts 97 and 99 will be closed and switch blade 100 will engage contact 100b causing the motor to rotate in the opposite direction with the result that the turret will rotate clockwise as viewed from above.

A suitable circuit is shown more or less schematically in Fig. 6 wherein conductor 110 leads from, say 110 volt A. C. circuit to contact 99, whereas conductor 110a leads to the primary coils of transformers 87 and 88. The other ends of said primary coils lead through conductor 111 to the contact blade 97. It will be seen that whenever contact blade 97 engages contact 99, the primaries of the two transformers will be energized. Conductor 112 connects the secondary of transformer 88 to the terminal 62-4. The other end of secondary coil of transformer 88 is connected via conductor 113 to the switch arm 100 where it is connected alternately to conductor 114 which leads to terminal 62-3 and through conductor 115 with terminal 62-1. One side of the secondary of transformer 87 leads through conductor 116 to lamp 82, the circuit being completed by return conductor 117 which connects with the said secondary through a tap. The other end of the secondary of transformer 87 is connected through conductor 118 to the meter 80, the other side of the meter being connected through conductor 119 with terminal 62-2. Conductor 118 also leads to terminal 62-5.

The terminal 60-1 on the turret member is connected via conductor 120 with one contact 121a of limit switch 121, the other contact 121b being connected through conductor 122 to the capacitor 76 and also connected through conductor 123 with one of the coils 51a of motor 51, the other end of which coil is connected through conductor 124 to one leg 75a of potentiometer 75 and through conductor 124a with terminal 60–4. The other side of the capacitor is connected through conductor 126 to the other motor coil 51b which has its other end connected to conductor 124. Conductor 126 is also connected via conductor 128 with contact 129a of limit switch 129, its other contact 129b being connected through conductor 130 with terminal 60–3. The other leg 75b of the potentiometer 75 is connected through conductor 131 with terminal 60–5 whereas the center leg 75c of the potentiometer 75 is connected through conductor 132 to the terminal 60–2.

Assuming that limit switches 121 and 129 are closed and that the terminals of the control instrument are connected with the corresponding terminals of the turret device through conductors in cable 61, it will be seen that, if the switch bar 90 is depressed by means of a force applied to the center thereof, the contacts 97—99 will be engaged, energizing the primaries of transformers 87 and 88. As a result lamp 82 will be illuminated and the indicator circuit is energized. It will be noted that the secondary of transformer 87 is connected across the legs 75a and 75b of potentiometer 75 so that the potentiometer resistance forms a bridge which is variably tapped by the adjustable center leg 75c. One side of the secondary of transformer 87 is connected to the meter 80 and the other side of the meter is connected to said center leg. Since leg 75a is connected to the other side of the secondary of transformer 87, the amount of current flowing in meter 80 will vary with the position of center leg 75c which is positioned in accordance with shaft 46. If force is applied to the left end of switch bar 90, the same effect will be produced and furthermore switch arm 100 will engage contact 100a establishing a circuit from one side of the transformer 88 through conductor 113, contacts 100 and 100a, conductor 114, terminal 62–3, cable conductor 61–3, terminal 60–3, conductor 130, limit switch 129, conductor 128, through motor coil 51b, through conductors 124, 124a, 61–4, and 112 to the other side of the secondary of transformer 88. Simultaneously, current will flow from conductor 128 through capacitor 176, conductors 122 and 123 through motor coil 51a. The current in coil 51a will lead the current in coil 51b thus producing a rotating field causing the rotor of motor 51 to rotate clockwise (Fig. 6). If now the right end of switch bar 90 is depressed, the switch arm 100 will engage contact 100b establishing the same general circuit except that motor coil 51b will be the one in series with the capacitor 76. Thus the field will rotate counter-clockwise and cause the motor to run in that direction.

The contacts of limit switches 121 and 129 are normally engaged. They are operated by means of a blade 140 of insulating material carried by a collar 141 (Figs. 1 and 6) which is mounted on shaft 46 for rotation therewith, preferably through a lost motion connection comprising a pin 142 carried by the shaft and located in a slot 143 in the collar 141. After shaft 46 approaches one end of its rotation, blade 140 will strike the end of contact blade 129a bending it over sufficiently to break the circuit between blades 129a and 129b. This stops the rotation of the motor in said direction but leaves open the circuit for rotating the motor in the opposite direction. If now the motor is rotated in said opposite direction (by depressing the other end of switch bar 90) for approximately 360°, the blade 140 will engage switch arm 121b breaking its contact with 121a, thus terminating the rotation in said direction. The loose connection between shaft 46 and collar 141 is desirable to assure that at least 360° of motion of the turret is permitted.

Fig. 8 represents the wiring diagram of a modified form of the invention in which the switch forming part of the control instrument is used in a somewhat different manner; viz., to cause the motor to rotate in one direction or another and also to control the energization of the lamp 82. In this case, only one transformer 87 is shown, it being utilized to energize the electric motor, the lamp 82 and the electrical indicating instrument 80. In this figure, parts which are similar are indicated by the same reference numerals as in the other figures and it is believed that the circuit is entirely clear from mere inspection thereof. The limit switches 121 and 129 of Fig. 6 have been omitted to simplify the showing as they are not always necessary.

Referring to Fig. 8, when the switch bar is depressed by a force applied at its center, contact 97 engages contact 99 and establishes a circuit from the right end of the transformer through lamp 82 to the transformer tap 117, thus energizing lamp 82. When the switch is operated by pressing down the right end of bar 90, the same connection is made to energize lamp 82 and contact 100 engages contact 100b to cause the motor to rotate in one direction. Reverse operation is effected when the other end of the switch bar is depressed. It will be noted that the primary coil of the transformer is continuously energized and that the indicating circuit is energized at all times when the switch bar is depressed. However, the indicating circuit may, if desired, be continuously energized. The mechanical construction of the switch may be identical with that shown in Figs. 2, 3, 4, and 6 but instead of controlling the 110 volt circuit, the switch controls merely the several low voltage circuits.

It will be noted that the construction shown and described will serve admirably to accomplish the objects stated above. It is to be understood, however, that the construction disclosed above is intended merely as illustrative of the invention and not as limiting as various modifications therein may be made without departing from the invention as defined by a proper interpretation of the claims which follow:

I claim:

1. In a variably positioned power operated device including an electric driving motor, a remotely positioned control instrument therefor including a power source and a plurality of conductors from said instrument to said device including a conductor connected to said power source and said motor, an electrically operated indicator forming part of said control instrument and connected to said conductor, a sender unit in said device for controlling said indicator connected to said conductor and operated by said device, and a return conductor from said sender to said instrument and a conductor from the other side of said instrument to said power source, whereby the position of said remotely positioned device is indicated at the control instrument.

2. In a variably positioned power operated device including an electric driving motor, a remotely positioned control instrument therefor including a power source and a plurality of conductors from said instrument to said device including a conductor connected to said power source and said motor, an electrically operated indicator forming part of said control instrument and connected to said conductor, a resistance varying unit in said device for controlling said indicator connected to said conductor and operated by said device, and a return conductor from said unit to said instrument and a conductor from the other side of said instrument to said power source, whereby the position of said remotely positioned device is indicated by said indicator at the control instrument.

3. In a variably positioned power operated device including an electric driving motor, a remotely positioned control instrument therefor including a power source and a plurality of conductors from said instrument to said device including a conductor connected to said power source and said motor, an electrically operated indicator forming part of said control instrument and connected to said conductor, a potentiometer unit in said device and operated thereby connected between said conductor and a conductor leading to the other side of said power source, the variable contactor of said potentiometer being connected to a return conductor leading to said instrument and a conductor from the other side of said instrument to said power source, whereby the position of said remotely positioned device is indicated by said indicator at the control instrument.

4. In a switch adapted to control a power operated device comprising an electric motor and a stepdown transformer having a primary coil connected to an A. C. power source and a secondary coil for energizing said motor, said switch having a manipulative member, a mounting for said member comprising a lever having an end pivotally mounted in the housing of the control instrument at one side of the manipulative member and the other end of the lever pivotally connected to the manipulative member, contact bridging means engageable by said manipulative member, and double-throw switch contacts so arranged that one of said double-throw switch contacts is engaged by said bridging means when the manipulative member is moved bodily and rocked in one direction and the other double-throw contact is engaged by said bridging means when the manipulative member is moved bodily and rocked in the other direction.

5. In a switch adapted to control two circuits comprising a manipulative member, a mounting for said member comprising a lever having one end pivotally mounted to one side of the manipulative member and the other end of the lever pivotally connected to the manipulative member, thereby enabling said manipulative member to be moved bodily with said lever or to be pivotally rocked with respect to said lever, a movable switch contact arm having an open and closed position, said arm being disposed in the path of bodily movement of said manipulative member whereby bodily movement of said manipulative member moves said arm to its open or closed position, contact bridging means engageable by said manipulative member, and double-throw switch contacts so arranged that one of said double-throw switch contacts is engaged by said bridging means when the manipulative member is moved bodily and rocked in one direction and the other double-throw contact is engaged by said bridging means when the manipulative member is moved bodily and rocked in the other direction, whereby one of said double-throw contacts is engaged concomitantly with the closing of said contact arm when the manipulative member is moved bodily and rocked in one direction and the other double-throw contact is engaged concomitantly with the closing of said contact arm when the manipulative member is moved bodily and rocked in the other direction.

6. In a switch including a housing adapted to control two circuits comprising a manipulative member, a mounting for said member comprising a lever having one end pivotally mounted in the switch housing at one side of the manipulative member and the other end of the lever pivotally connected to the manipulative member thereby enabling said member to be both depressed and rocked, first contact means below said manipulative member which are closed when said member is depressed and other contact means which are closed when said member is depressed and rocked.

References Cited in the file of this patent

UNITED STATES PATENTS

| | | |
|---|---|---|
| 786,024 | Gomborow | Mar. 28, 1905 |
| 871,050 | Vogt | Nov. 12, 1907 |
| 965,158 | Cowles | July 26, 1910 |
| 1,397,254 | Karschitz | Nov. 15, 1921 |
| 1,716,373 | Ellis | June 11, 1929 |
| 1,872,395 | Bobroff | Aug. 16, 1932 |
| 1,886,519 | Bobroff | Nov. 8, 1932 |
| 1,893,371 | Knowlton | Jan. 3, 1933 |
| 1,954,272 | Taylor | Apr. 10, 1934 |
| 1,988,343 | Tacy | Jan. 15, 1935 |
| 2,005,293 | Harris et al. | June 18, 1935 |
| 2,098,227 | Chauveau | Nov. 9, 1937 |
| 2,113,180 | Klein | Apr. 5, 1938 |
| 2,237,604 | Marique | Apr. 8, 1941 |
| 2,277,905 | Eaton | Mar. 31, 1942 |
| 2,376,527 | Wills | May 22, 1945 |
| 2,393,482 | Smith | Jan. 22, 1946 |
| 2,433,970 | Yardeny | Jan. 6, 1948 |
| 2,455,025 | Schroeder | Nov. 30, 1948 |
| 2,464,184 | Pearce | Mar. 8, 1949 |
| 2,498,957 | Jordan | Feb. 28, 1950 |
| 2,559,339 | Blease et al. | July 3, 1951 |